United States Patent [19]

Apple et al.

[11] Patent Number: 5,221,846
[45] Date of Patent: Jun. 22, 1993

[54] RADIOGRAPHIC SYSTEM WITH IMPROVED IMAGE QUALITY

[75] Inventors: Bernard A. Apple, Hendersonville, N.C.; Jacob Beutel, Hockessin, Del.; Bob E. McConnell, West Chester, Pa.; Daniel J. Mickewich, Wilmington, Del.; Raymond J. Russell, Hockessin, Del.

[73] Assignee: E. I. Du Pont de Nemours and Company, Wilmington, Del.

[21] Appl. No.: 798,787

[22] Filed: Nov. 27, 1991

[51] Int. Cl.⁵ .......................... G03C 1/46; G21J 4/00
[52] U.S. Cl. ................................. 250/483.1; 430/966; 430/967; 430/496
[58] Field of Search ............... 250/483.1, 370.09, 368, 250/370.11, 327.2, 484.1, 486.1; 358/111; 430/966, 967, 496, 502

[56] References Cited

U.S. PATENT DOCUMENTS

| | | | |
|---|---|---|---|
| 3,849,658 | 11/1974 | Jeurissen et al. | 250/486.1 |
| 4,024,069 | 5/1977 | Larach | 252/301.4 |
| 4,030,922 | 6/1977 | Honjo et al. | 378/32 |
| 4,130,428 | 12/1978 | Van Doorselaer | 250/483.1 |
| 4,140,531 | 1/1979 | Jamieson | 96/94 |
| 4,225,653 | 9/1980 | Brixner | 428/539 |
| 4,777,125 | 10/1988 | Delfino et al. | 430/567 |
| 4,900,652 | 2/1990 | Dickerson et al. | 430/502 |
| 4,931,642 | 6/1990 | Hosoi et al. | 250/327.2 |
| 5,021,327 | 6/1991 | Bunch et al. | 430/496 |
| 5,028,518 | 7/1991 | Lyons et al. | 430/506 |
| 5,028,520 | 7/1991 | Ito | 430/567 |

OTHER PUBLICATIONS

Research Disclosure, 184, Aug. 1979, Item 18431, LR No. 31804, 1-2, pp. 433, 437-438.

Primary Examiner—Carolyn E. Fields
Assistant Examiner—Drew A. Dunn

[57] ABSTRACT

A wide latitude, high resolution radiographic system having a relative speed of at least 150 and a contrast transfer function of at least 0.30 when measured at 6 line pairs per millimeter, comprises at least one X-ray intensifying screen in operative association with a photosensitive silver halide element having a maximum contrast of less than or equal to 3.0 produces superior images, particularly chest images over a wide range of exposures, without the decrease in image quality or contrast normally seen in wide latitude systems.

8 Claims, 7 Drawing Sheets

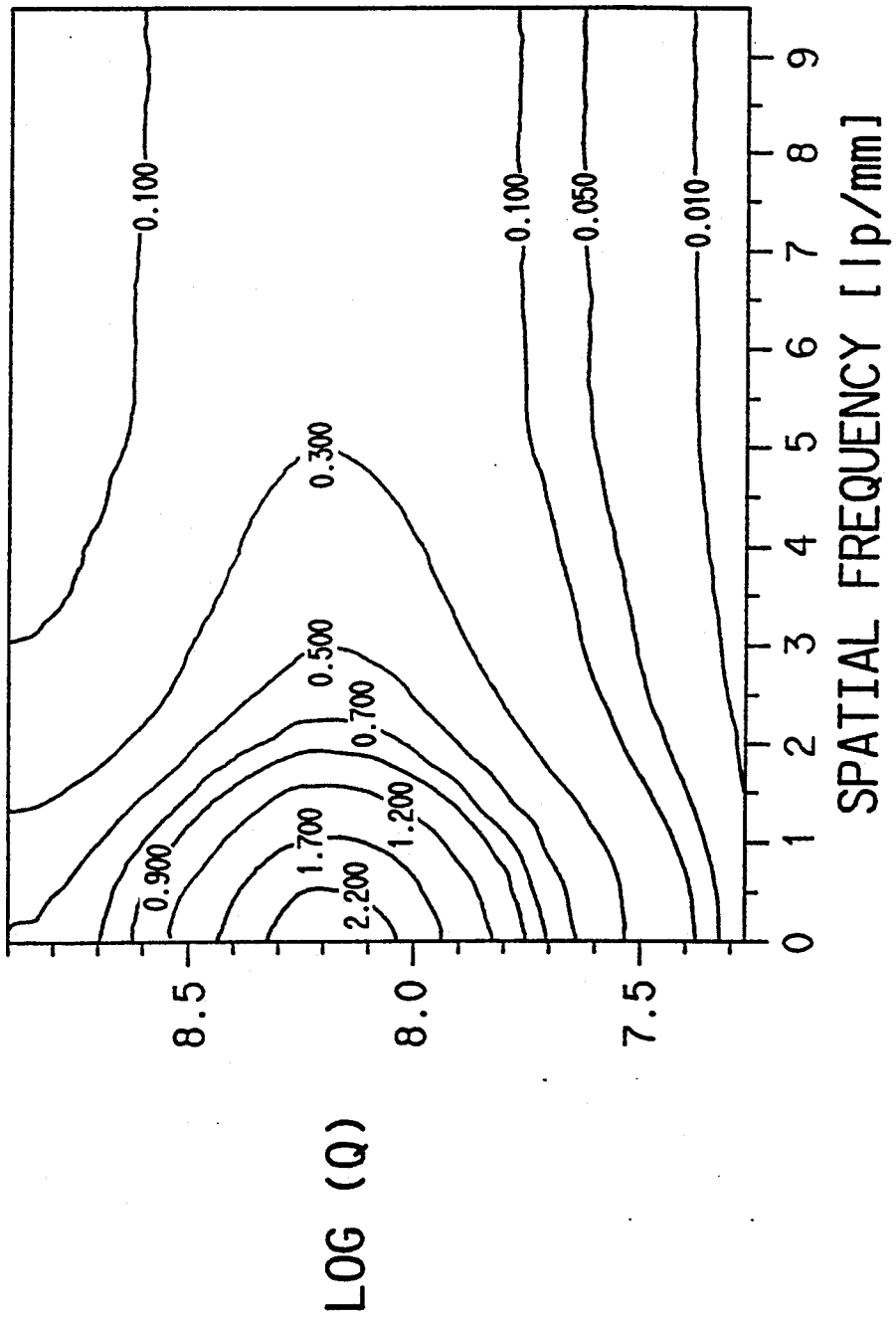

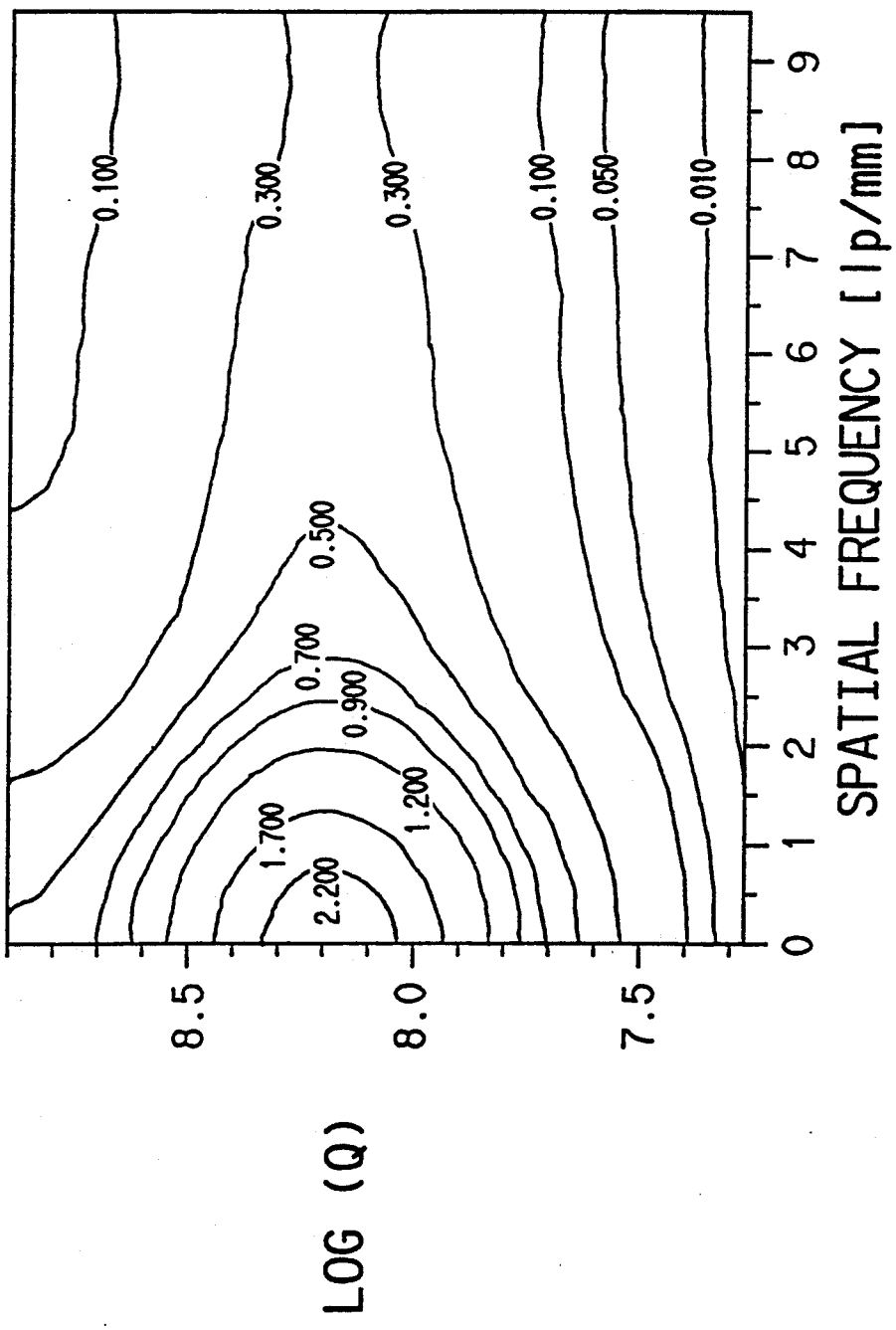

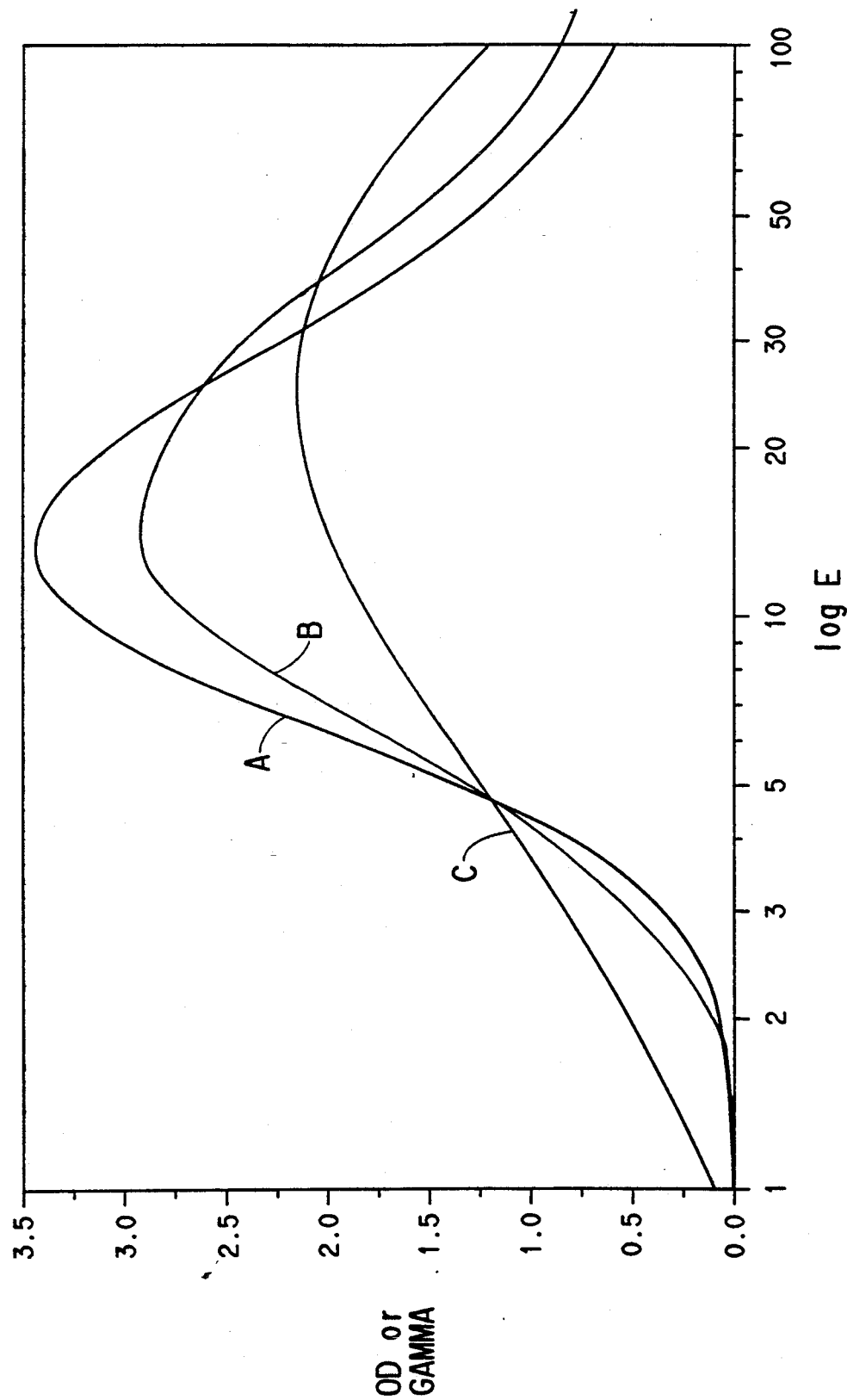

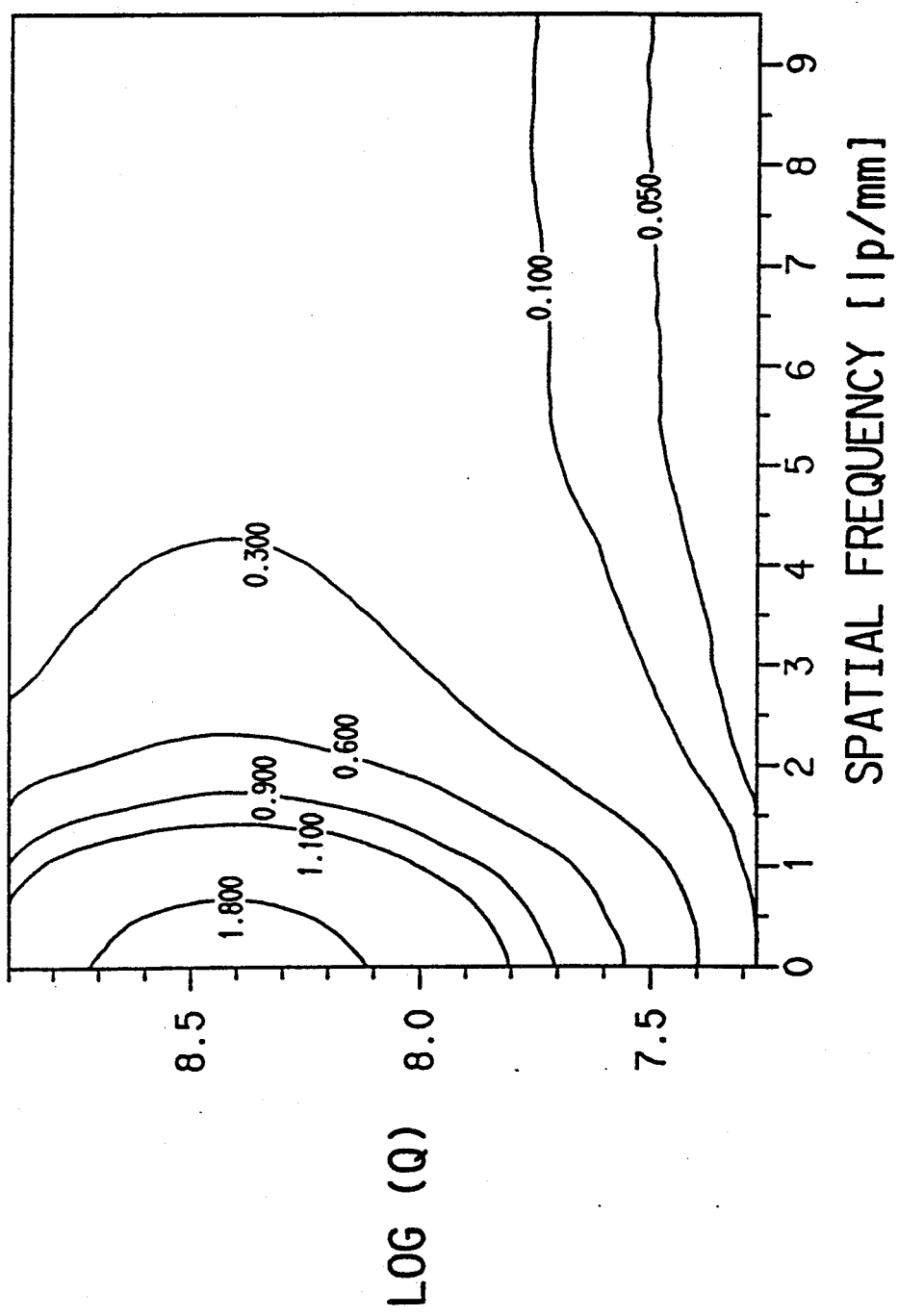

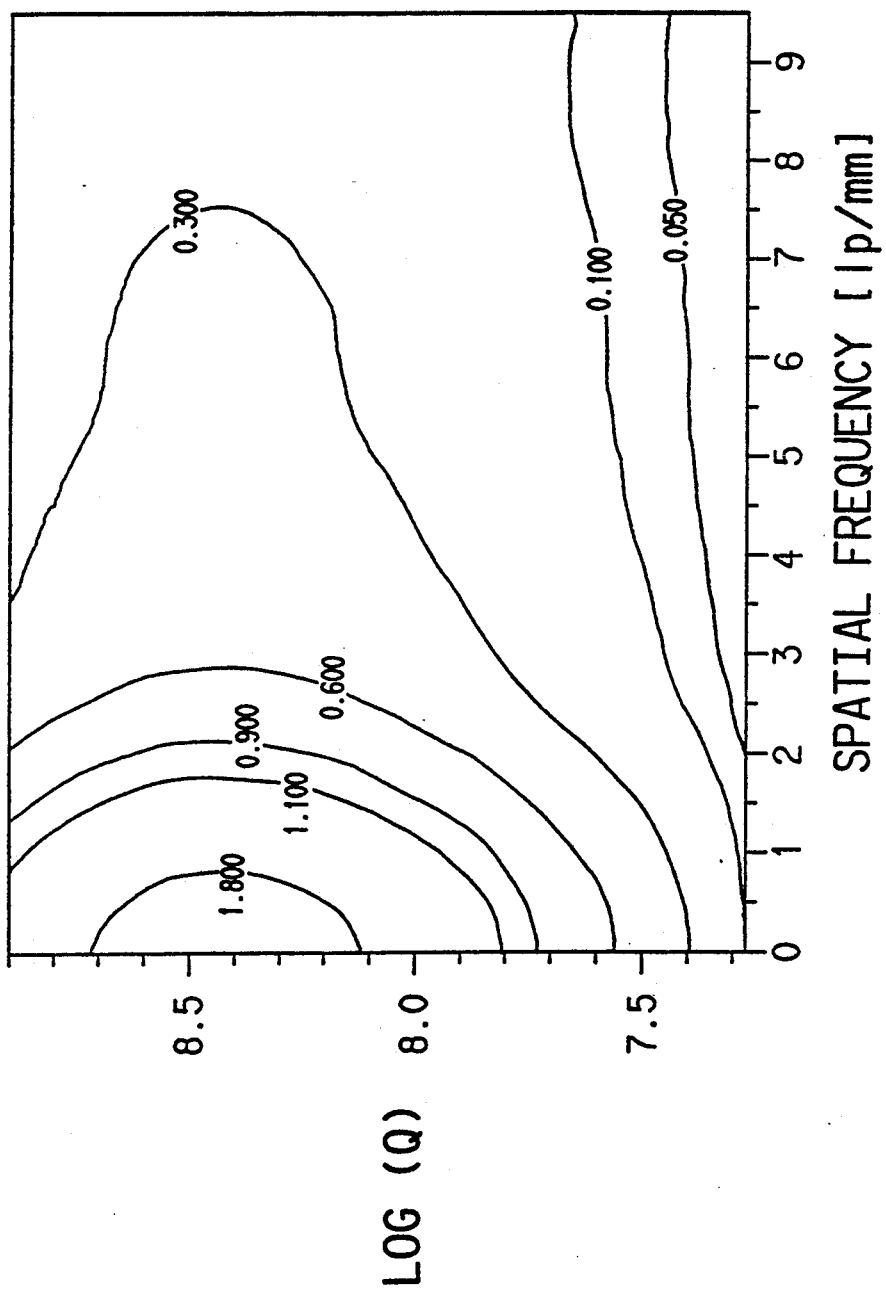

RADIOGRAPHIC SYSTEM WITH IMPROVED IMAGE QUALITY

CROSS-REFERENCE TO RELATED APPLICATIONS

This application is related to copending U.S. application Ser. Nos. 07/520,285 filed May 7, 1990; 7/725,160 filed Jul. 3, 1991; and 07/725,154 filed Jul. 3, 1991.

FIELD OF INVENTION

This invention relates to medical radiographic systems with improved image quality. More specifically this invention relates to medical radiographic systems which provide improved image quality without loss of exposure range.

BACKGROUND OF THE INVENTION

Medical radiography has been exploited for many years as a means for observing and diagnosing internal abnormalities in living organisms. A patient is typically exposed to X-rays which are selectively and partially absorbed by tissues and bone as they pass through the patient. The X-radiation which passes partially attenuated through, the patient-carries information about the patient internal structure. Efforts aiming to capture and display this information with the highest degree of accuracy, minimal loss of information content and minimal patient exposure constitute the basis for a large part of the research effort in radiography.

Modern medical radiography systems typically utilize one or two phosphor intensifying screens which absorb X-rays and emit longer wavelength visible or ultraviolet light, thus translating the information initially contained in the X-ray beam to information carried by longer wavelength radiation. This longer wavelength image then impinges on a photographic element which is sensitive to the actinic light emitted by the intensifying screen or screens. This photographic element comprises one or two photosensitive layers coated on either side of a support. On absorbing actinic light emitted by the intensifying screen or screens a latent image is formed in the photographic element, thus rendering the photographic element developable and allowing an image of the information originally carried by the X-ray beam to be recorded as a permanent image.

It is the aim of film/screen radiographic systems to provide an image which records the information carried by the X-ray beam traversing the patient as faithfully as possible. However, the ability of the film/screen system to render a faithful reproduction of the information carried by the X-ray beam is limited by (a) the various physical processes which occur in the course of converting the X-ray energy to visible light and (b) the film's limited response to the generally wide range of light intensities constituting the converted image. The conversion of X-ray energy to actinic light depends on the probability of each one of a sequence of steps as follows:

(a) the probability that the screen will absorb an incoming X-ray quantum, (b) the probability that a phosphor particle will emit a certain number of light photons, and finally (c) the probability that a light photon, once emitted by a phosphor particle and then being subjected to light scattering and possible absorption within the screen, will emerge at the surface of the screen facing the photosensitive element.

The fact that the X-ray absorption and X-ray to light conversion processes are statistical introduces random fluctuations in light intensity which are recorded as image noise and are commonly called "quantum noise"; light scattering also introduces noise, but, because of the increased chance that light photons emitted deep within the screen and at wide angles with respect to the screen's surface will be absorbed, light scattering limits the size of the cone of light which emerges on the screen's surface and whose apex lies at the point where an X-ray quantum has been absorbed within the screen. Thus, light scattering coupled with internal light absorption actually improves the screen's ability to faithfully reproduce the information carried by the X-ray beam in that it improves the screen's ability to resolve fine details, i.e., by improving the screen's resolution as determined by its Modulation Transfer Function (MTF).

The ability of the film to faithfully record the converted image emerging from the screen is limited by its dynamic range, i.e., by the ability of the film to produce an observable change in developed optical density for the entire range of light intensities (exposures) projected by the image emanating from the screen. In general, the film is only able to record, i.e., to produce observable changes in developed optical density, for a limited range of exposures and this is characterized by the film's contrast curve, a plot of dD/d(log E) vs. log E (where D is the developed optical density and E is the exposure), which is familiar in the art. The range of exposures over which there is adequate contrast is defined by a lower and an upper exposure limit. The lower exposure limit is that which will produce a density which is detectable above the base plus fog. The upper exposure limit is defined as that which will produce an output density which is detectable below the maximum density of the film. If the differences in X-ray absorption by the tissues of the subject are small, such as in mammography where very little difference in the density of the tissues is observed, the subject contrast is considered low and it is necessary to use a film whose contrast is high in order to render the small differences in absorption distinguishable in the resulting radiograph. Conversely, if the subject matter being examined provides large differences in X-ray absorption (e.g. chest radiography or angiography where the difference in density of bone and soft tissue is large) the contrast of the film may be lower because the subject contrast is already adequately high.

Lastly, in those systems employing two screens to expose photosensitive elements having a photosensitive layer coated on both sides of a support, i.e., so-called double side coated films, there is an additional source of image degradation called "print-through" or "crossover" in which light emanating from the front screen (i.e., the screen nearest to the incoming X-ray beam) penetrates through the transparent support to the photosensitive layer on the back side of the support and vice versa. This crossing over of light from front to back and vice versa causes light to spread as it passes through the transparent support and thus degrades the ability of the recording system to record fine details, i.e., the systems resolution as measured by its MTF.

FIG. 1 shows the combined effects of light scattering coupled with internal light absorption and of print-through on the resolution of the two-screen/double side coated film system. A phosphor particle 1, within the upper screen 2, absorbs an X-ray quantum 3, and emits light 4. While some of the emitted light, particularly light emitted at a large angle with respect to the screen's surface is absorbed within the screen, a fraction of the emitted light emerges, forming a light cone whose diameter at the screen's surface is much larger than the point from which the light originally emanated, thereby resulting in a loss of resolution. A fraction of this emerging light is absorbed by the photosensitive layer 5, adjacent to the emitting screen; however, another, smaller fraction of the emitted light penetrates through the first layer 5, the transparent support 6, and is recorded by the photosensitive layer 7, on the other side of the support. As the light traverses the support 6, it is subject to further spreading, thus further degrading the system's MTF. For clarity, decrease in MTF emanating from the optional lower screen 8, is not shown.

Improvements in the photosensitive element have been provided wherein a dyed layer is interposed between at least one photosensitive layer and the support as described, e.g., in Diehl and Factor, U.S. Pat. No. 4,950,586. The dyed underlayer absorbs the light which would otherwise penetrate to the photosensitive layer on the opposite side. This method is disadvantageous in that the additional dyed underlayers increase manufacture cost and may impart an objectionable color to the photographic element by leaving a dye residue after processing. Moreover, the screens still limit the systems resolution as described above, since, even with "zero" print-through, the best image which can be captured by the film is that which is emitted by the screen.

One method to improve the film's dynamic range well known to the art and referenced in *Formulating X-ray Technics*, 5th ed., Cahoon, Duke University Press, 1961, pg. 11, is to use a thin front screen to "balance" the front and back screen's X-ray absorption. Thus, for instance, if the front screen absorbs 30 of 100 incoming X-ray quanta (30%) then, to make the back screen's absorption equal to that of front screen, it must absorb the remaining 70 photons [i.e., $100 \times (30/70) = 42.8\%$]. Thus, since the back screen must then absorb a larger percentage of X-ray quanta, the back screen must have a higher phosphor coating weight than the front screen. However, since the MTF of the screen decreases with increasing phosphor coating weight, this method tends to further decrease the MTF of the back screen and thereby the MTF of the image recorded by the film.

In a recent development disclosed by Bunch and Dickerson, EP 384643A, a "zero" print-through film, using a dyed underlayer and having emulsions with widely differing contrast curves is used in combination with a thin/thick screen pair to widen the dynamic range of the system. The above mentioned limitations on resolution and disadvantages of using a dyed underlayer also apply to the teachings of Bunch and Dickerson.

In general, it is known to the art that the signal recorded by the film/screen system can be characterized by means of the Contrast Transfer Function (CTF) as described in Dainty and Shaw, *Imaging Science*, Academic Press, London-New York-San Francisco 1974, p.234ff. This function is defined by:

$$CTF(f,E) = MTF(f) \times \gamma(E)$$

where f is the spatial frequency of a test object, E is the exposure and $\gamma(E)$ is the contrast function which is defined as:

$$\gamma(E) = dD/d(\log E)$$

wherein D is optical density and E is exposure. This function shows how the system contrast decreases with increasing spatial frequency. The slower the decrease in CTF with increasing spatial frequency and the wider the range of exposures over which the contrast is significantly higher than zero, the greater is the ability of the system to record a wide range of information.

Contrast ($\gamma(E)$) curves are provided in FIG. 5 wherein Curve A represents a conventional high contrast film, Curve B represents a conventional latitude film and Curve C represents a very wide latitude film. In accordance with the definition of CTF(f,E) a contrast film with a higher $\gamma(E)$ exhibits a higher CTF(f,E) than the corresponding latitude film at the same relative exposure and system MTF(f). To achieve this increased CTF(f,E), or image resolution, the useable exposure range is decreased versus the latitude films of Curves B and C as indicated in FIG. 5.

It is the aim of the present invention to circumvent the above mentioned deficiencies in the art by improving the useable exposure range of diagnostic radiographic images without loss of image quality.

SUMMARY OF THE INVENTION

A radiographic system with improved image quality and broader exposure latitude is provided in a high resolution radiographic system comprising at least one X-ray intensifying screen in operative association with a photosensitive silver halide element wherein the contrast transfer function of said radiographic system is at least 0.30 when measured at 6 line pairs per millimeter; said silver halide element has a maximum contrast of no greater than 3.0 and preferably no greater than 2.5; and wherein said radiographic system has a relative speed of at least 150, preferably 250 and most preferably 350.

A preferred embodiment of the instant invention provides for a high resolution radiographic system with broader exposure latitude which comprises at least one silver halide element in operative association with an ultraviolet emitting X-ray intensifying screen. The radiographic system has a contrast transfer function of at least 0.30 when measured up to 6 line pairs per millimeter and the film has a maximum contrast of no greater than 3.0 with a system speed of at least 150.

BRIEF DESCRIPTION OF THE DRAWINGS

FIG. 3 is a CTF curve for a conventional high resolution radiographic system having an X-ray screen and a wide latitude film.

FIG. 4 is a CTF curve of a high resolution radiographic system in accordance with the present invention.

FIG. 5 is a contrast curve for three commercially available X-ray films used to generate the CTF curves herein.

FIG. 6 is a CTF curve of a conventional chest radiography system having an X-ray screen and a wide latitude chest film.

FIG. 7 is a CTF curve of a high resolution radiographic system of the present invention using the wide latitude chest film used in FIG. 6.

DETAILED DESCRIPTION OF THE INVENTION

Figure 1:
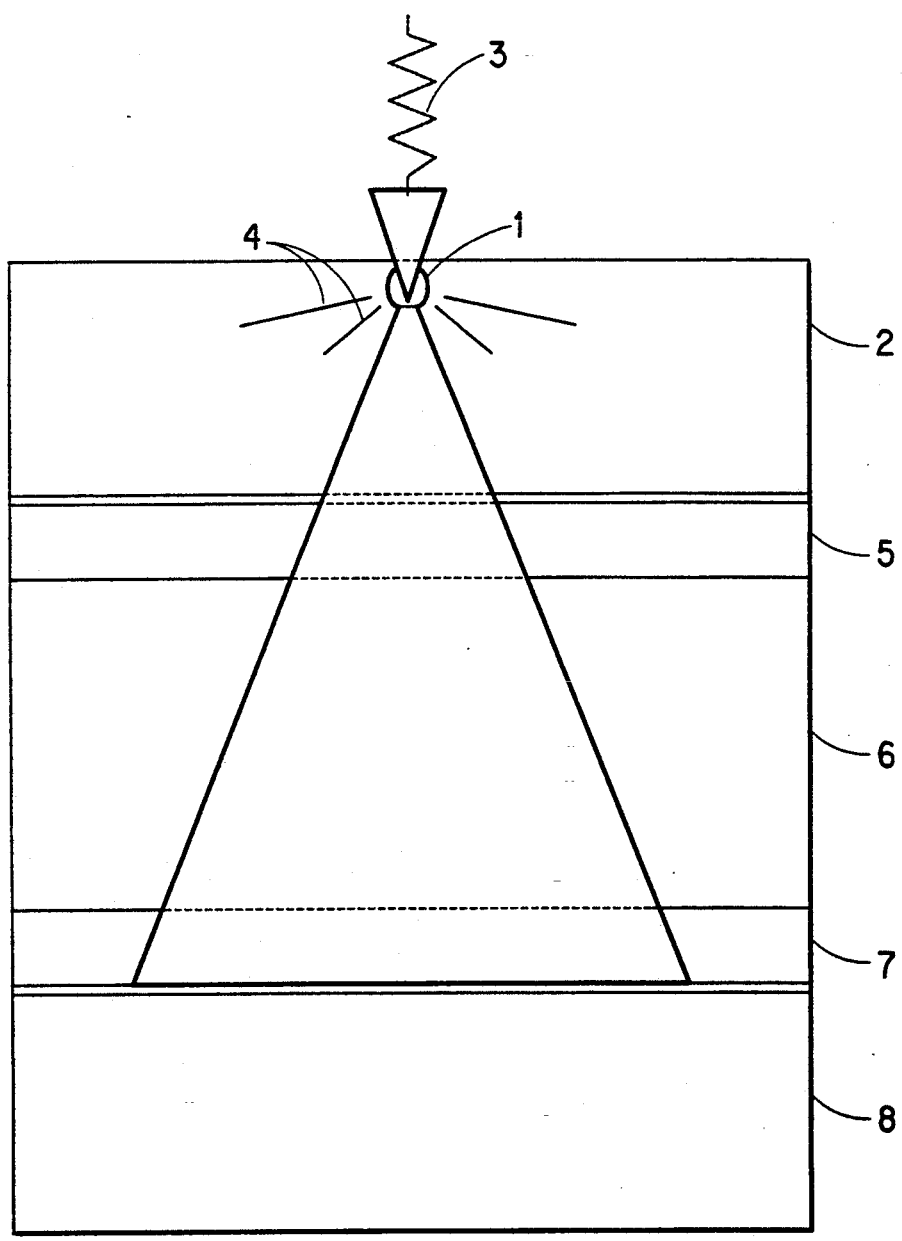
FIG. 1 is a schematic illustration of the path of photons emitted from an excited phosphor particle in a conventional film/X-ray screen system.
Figure 2:
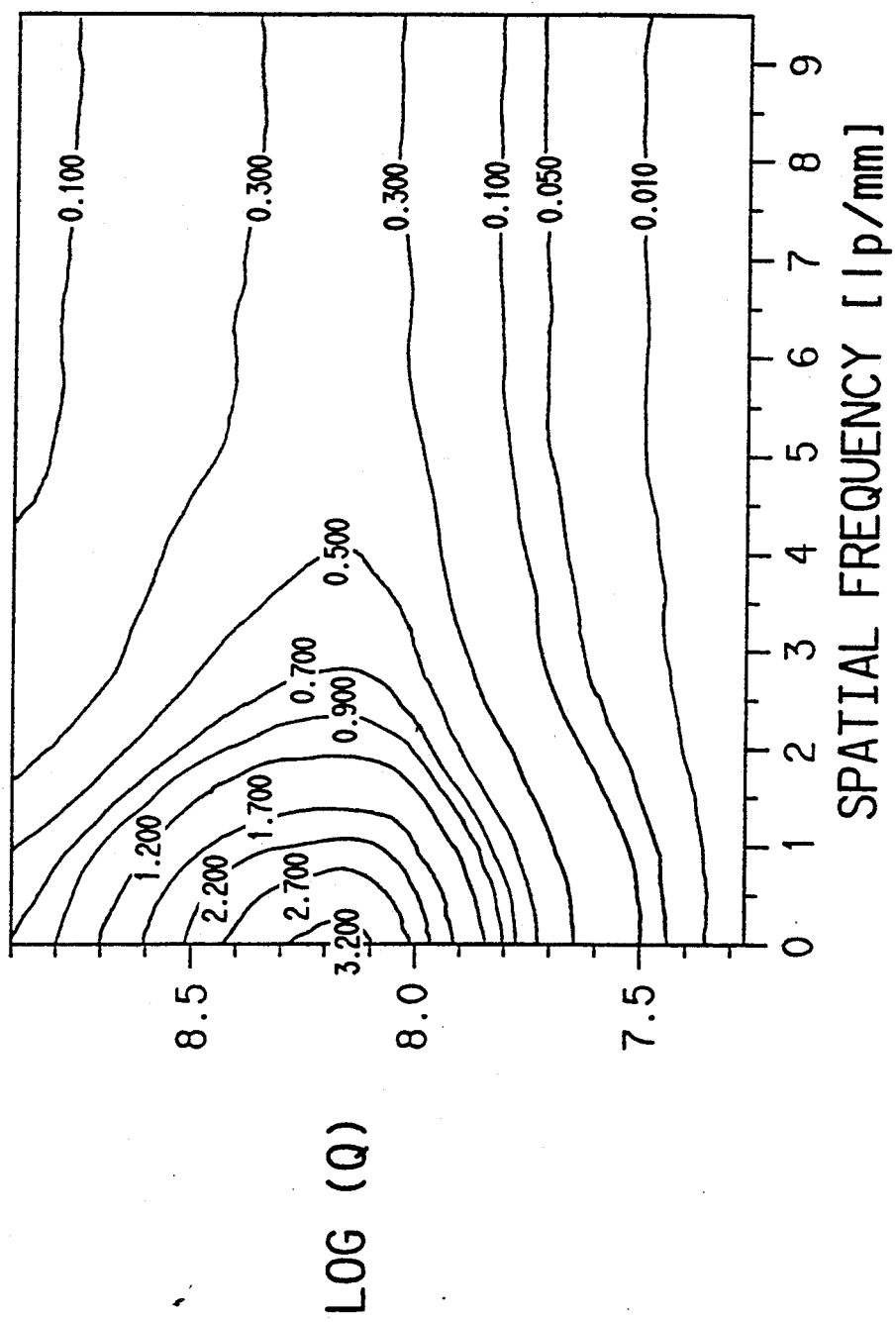
FIG. 2 is a Contrast Transfer Function (CTF) curve for a conventional high resolution radiographic system having an X-ray screen and a high contrast film.

FIG. 2 comprises a representative CTF for a known high resolution film/screen system wherein a higher CTF value represents higher recorded signal strength. This control example has a relative speed of approximately 250 and employs a predominantly blue-emitting Quanta Fast Detail® X-ray intensifying screen with Cronex® 10T which is a blue-sensitive medical X-ray film with a $\gamma$max of 3.4. Both the film and screen are commercially available from E. I. du Pont de Nemours and Co. (Wilmington, Del.).

FIG. 3 illustrates the loss of CTF observed when the identical screen, and substantially similar modulation transfer function, is employed with a high resolution latitude film, such as Cronex® 10L ($\gamma$max=2.6), which is also commercially available from E. I. du Pont de Nemours and Co. The CTF decreases dramatically with the lower contrast, high latitude film, especially in the higher spatial frequency regions, such as above about 3 line pairs per millimeter.

FIG. 4 illustrates a system in accordance with the present invention in which an ultraviolet emitting X-ray intensifying screen is employed in combination with a latitude film. The CTF for this combination is comparable to that exhibited in the conventional high resolution, high contrast system illustrated in FIG. 2. The CTF illustrated in FIG. 4 and the CTF illustrated in FIG. 2 provide substantially identical information yet the latitude, or available exposure range (see FIG. 5), is greatly improved in the system of the invention. With reference to FIG. 5, curves A, B and C represent the $\gamma$ as a function of LogE for Cronex® 10T, Cronex® 10L and a commercially available wide latitude chest film, respectively. As can be seen, the contrast and latitude of a film are inversely related to one another, whereby wide latitude is obtained with a sacrifice in contrast, and vice versa.

Chest radiography is a particular challenge in medical imaging due to the high subject contrast as described above. FIG. 6 depicts a CTF for a commercially available chest imaging film with a conventional $\gamma$max (2.14) and the substantially identical MTF function of the above controls. With the teachings provided herein an ultraviolet emitting screen provides a CTF as illustrated in FIG. 7, wherein substantial improvements in available image information are provided without sacrificing available exposure range.

The aforementioned CTF(f,E) is a function of MTF(f) and $\gamma$(E) and is therefore a calculated function as known in the art. The determination of MTF(f) is well known and described in Dainty and Shaw, *Imaging Science*, Academic Press, London-New York-San Francisco 1974, p. 234–58. The theoretical maximum for MTF is unity, with decreasing MTF depicting a decreasing ability to reproduce exposure fluctuations at increasing frequency. The major contributor to a decrease in MTF for a medical X-ray screen/film system is the screen; the contribution from the film involved is typically minor. The unique combination of an ultraviolet emitting X-ray intensifying screen with a uniquely chosen photographic element substantially improves the system MTF(f) as exemplified in Beutel and Issler, U.S. application Nos. 07/520,285 filed May 7, 1990 and 07/725,154 filed Jul. 3, 1991 which are incorporated herein by reference, and in Beutel and Mickewich, U.S. application No. 07/725,160 filed Jul. 3, 1991 which is likewise incorporated herein by reference.

The speed in a photographic system is broadly defined as the exposure required to obtain a predetermined density under standard processing conditions. For a medical X-ray system, the specific procedure is detailed in ANSI Standard, PH2.9, 1964. It is widely accepted in the art to report a relative speed wherein the speed is determined relative to PAR which is arbitrarily assigned a speed value of 100. PAR speed is determined with a standard $CaWO_4$ screen with a 84 mm phosphor thickness in combination with a du Pont Cronex® 4 film. Relative speed for a medical X-ray system is determined at a density of 1.0 above base plus fog density by exposure modulation techniques as exemplified in *SPSE Handbook of Photographic Science And Engineering*, Woodlief, Ed.; John Wiley and Sons, New York, 1973, pp. 798–800.

The radiological system of the present invention has a relative speed of at least 150. At relative system speeds below 150, subject dosage becomes objectionable and may be deleterious to patient health. As is known in the art, the relative speed of the system may be altered by increasing the thickness of the phosphor layer or by film changes. Film changes include such things known in the art as various spectral and chemical sensitization techniques, grain size and composition alterations and the like.

Film contrast, or $\gamma(E)$, represents the variation in film density as a function of exposure difference as determined above. Exposure latitude depends primarily on the breadth of the $\gamma$ curve and particularly on the curvature near the maximum of the $\gamma$ curve. Methods to alter film contrast are known and comprise such things as incorporating mixed grain sizes or morphologies, binder hardening or cross-linking variations, various binder additives and others as known in the art. Film contrast can also be readily altered by variations in the coating weight of the silver halide grains.

The preferred X-ray intensifying screen for use in the present invention emits in the UV region under X-ray excitation. There are many phosphors which emit in the ultraviolet region when exposed to X-radiation. The use of such phosphors in X-ray screens, however, has not been favored in the past because radiographs made with X-ray intensifying screens prepared from UV emitting phosphors have low contrast and depressed maximum density ($D_{max}$). Loss of maximum density decreases the dynamic range of the film significantly, which requires increased X-ray exposure to obtain an acceptable image. This increased X-ray dosage, however, is deleterious to patient health and, therefore, it has not been conventional in the prior art to employ UV emitting screens.

Typical UV emitting phosphors are, for example, M' phase $YTaO_4$ either alone or activated with gadolinium, bismuth, lead, cerium or mixtures of these activators; LaOBr activated with gadolinium or gadolinium and thulium; and $La_2O_2$ activated with gadolinium, among others. For the purpose of this invention, UV emitting phosphors will have at least 80% of their emission in the range of 300 to 390 nm and preferably in the range of 310 to 360 nm. For the phosphors of this invention to be applicable in practical X-ray imaging systems, the conversion efficiency of the phosphor, i.e. the efficiency with which the energy carried by an X-ray quantum is absorbed by the phosphor and then converted to emitted light photons, should be higher than 5%.

Conventionally, a intensifying screen comprises a support having a phosphor-binder coating and a topcoat or protective layer applied thereto. The protective layer is important to protect the phosphor layer against mechanical damage. The protective layer should generally also be UV transparent so that the flow of UV light from the phosphor is not decreased by more than approximately 10%. Those materials that are known to absorb a great deal of UV light (e.g., polyethylene terephthalate films) are not particularly useful as topcoat layers within this invention. A reflective layer comprising a whitener (e.g, $TiO_2$) dispersed in a suitable binder, may also be incorporated into the screen structure. Commonly, this reflective layer is interposed between the phosphor layer and the support, or, alternatively, the whitener may be dispersed directly into the support. The reflective layer generally increases the light output of the intensifying screen during use.

In operation, the intensifying screen absorbs X-rays that impinge thereon and emits energy having a wavelength that is readily captured by the photographic silver halide X-ray film associated therewith. Recently, an effective class of X-ray intensifying phosphors based on yttrium, gadolinium or lutetium tantalate has been introduced. These particular phosphors, which have the monoclinic M' phase, is particularly effective in capturing X-rays. Some of these tantalate phosphors are also efficient emitters of UV light and are particularly preferred within the metes and bounds of this invention. These phosphors and corresponding screens are generally prepared according to the methods of Brixner, U.S. Pat. No. 4,225,653, which is incorporated herein by reference. The phosphors of this invention, which preferably emit at least 80% of their light between 300 nm and 390 nm, are generally manufactured by intimately mixing the various precursor oxides together and firing the mixture in a suitable flux at elevated temperatures. Particularly suitable fluxes are described, for example, in Hedden and Zegarski, U.A. application Ser. No. 07/789,484, filed Nov. 12,1991, (IM-0582), the disclosure of which is incorporated by reference. After firing, pulverizing and washing, the phosphor is dispersed in a suitable binder, typically in the presence of a suitable solvent, and coated on a support. In the present invention, the binder must absorb less than 10% of any UV light emitted from said phosphor. The protective topcoat, if present, is applied over the phosphor-binder coating. The use of a protective topcoat is preferred in the present invention.

In a particularly preferred embodiment, the X-ray intensifying screen contains M' $YTaO_4$ phosphor made as described above dispersed in a mixture of acrylic resins using a solvent. This dispersion is then coated on a polyethylene terephthalate support containing a small amount of anatase $TiO_2$ whitener dispersed therein. The phosphor may be coated to a coating weight of ca. 15 to 110 mg of phosphor per $cm^2$. A topcoat of styrene/acrylonitrile copolymer is coated thereon and dried.

The radiological system of the present invention preferably utilizes a photosensitive silver halide film element with the above described X-ray intensifying screens, provided that said element has a maximum contrast, $\gamma(E)$, of no greater than 3.0. These elements generally comprise one or more silver halide emulsion layers coated on a support. The emulsion may be coated in one or more layers on one or both sides of the support and a thin, hardened gelatin overcoat is usually applied over the uppermost emulsion layer to provide protection thereto. Since the emulsions useful within the ambit of this invention are generally UV sensitive in and of themselves, dyes may not be required. However, if required, a small amount of a sensitizing dye might advantageously be added. It may be particularly advantageous to add a sensitizing dye to tabular silver halide emulsions in order to increase their ability to respond to light.

The silver halide emulsion may employ any of the conventional halides but preferred are pure silver bromide or silver bromide with small amounts of iodide incorporated therein (e.g. 98% Br and 2% I by weight for example). Both polyhedral and tabular grain morphology is suitable for use in the present invention including, but not limited to, grains which are formed by splash techniques and those formed by processes involving spray techniques (i.e. single and double jet procedures). Tabular grain silver halide products made in accordance with the processes described by Maskasky in U.S. Pat. No. 4,400,463; Wey, U.S. Pat. No. 4,399,205; Dickerson, U.S. Pat. No. 4,414,304; Wilgus et al., U.S. Pat. No. 4,434,226; Kofron et al., U.S. Pat. No. 4,439,520; Nottorf, U.S. Pat. No. 4,722,886; and Ellis, U.S. Pat. No. 4,801,522, are most preferred.

After the grains are made, it is usually preferable to disperse the grains with a binder, typically gelatin and/or other natural or synthetic water-permeable organic colloid binding agents. Such agents include water permeable or water-soluble polyvinyl alcohol and its derivatives, e.g., partially hydrolyzed polyvinyl acetates, polyvinyl ethers, and acetals containing a large number of extralinear —$CH_2HOH$— groups; hydrolyzed interpolymers of vinyl acetate and unsaturated addition polymerizable compounds such as maleic anhydride, acrylic and methacrylic acid ethyl esters, and styrene. Suitable colloids of the last mentioned type are disclosed in U.S. Pat. Nos. 2,276,322; 2,276,323; and 2,347,811. The useful polyvinyl acetals include polyvinyl acetalaldehyde acetal, polyvinyl butyraldehyde acetal and polyvinyl sodium o-sulfobinzaldehyde acetal. Other useful colloid binding agents include the poly-N-vinyllactams of Bolton U.S. Pat. No. 2,495,918; the hydrophilic copolymers of N-acrylamido alkyl betaines described in Shacklett U.S. Pat. No. 2,833,650; and hydrophilic cellulose ethers and esters. Phthalated gelatins may also be used as well as binder adjuvants useful for increasing covering power such as dextran or the modified, hydrolyzed gelatins of Rakoczy, U.S. Pat. No. 3,778,278.

It is most preferable to chemically sensitize the grain with salts that are well known in the art. The most common sensitizers are salts of gold or sulfur. Sulfur sensitizers include those which contain labile sulfur, e.g., allyl isothiocyanate, allyl diethyl thiourea, phenyl isothiocyanate and sodium thiosulfate for example. Other non-optical sensitizers such as amines as taught by Staud et al., U.S. Pat. No. 1,925,508 and Chambers et al., U.S. Pat. No. 3,026,203; and metal salts as taught by Baldsiefen, U.S. Pat. No. 2,540,086 may also be used.

The emulsions can contain other adjuvants, such as antifoggants (e.g., 6-nitrobenzimidazole, benzotriazole, triazaindenes, etc.) as well as hardeners (i.e., chrome alum, formaldehyde, dimethylol urea, mucochloric acid, and others recited in *Research Disclosure*, No. 308, December 1989, Item 30819). Other emulsion adjuvants that may be added comprise matting agents, plasticizers, toners, optical brightening agents, surfactants, image color modifiers, non-halation dyes, and covering power adjuvants among others, all of which are known in the art.

The film support for the emulsion layers used in the process may be any suitable transparent plastic. For example, the cellulosic supports, e.g., cellulose acetate, cellulose triacetate, cellulose mixed esters, etc. may be used. Polymerized vinyl compounds, e.g., copolymerized vinyl acetate and vinyl chloride, polystyrene, and polymerized acrylates may also be mentioned.

Preferred films include those formed from the polyesterification product of a dicarboxylic acid and a dihydric alcohol made according to the teachings of Alles, U.S. Pat. No. 2,779,684 and the patents referred to in the specification thereof. Other suitable supports are the polyethylene terephthalate/isophthalates of British Patent 766,290 and Canadian Patent 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al., U.S. Pat. No. 3,052,543 may also be used. The above polyester films are particularly suitable because of their dimensional stability.

When polyethylene terephthalate is manufactured for use as a photographic support, the polymer is cast as a film, the mixed polymer subbing composition of Rawlins, U.S. Pat. No. 3,567,452 is applied and the structure is then biaxially stretched, followed by application of a gelatin subbing layer. Alternatively, antistatic layers can be incorporated as illustrated, for example, by Miller, U.S. Pat. Nos. 4,916,011 and 4,701,403; Cho, U.S. Pat. Nos. 4,891,308 and 4,585,730; and Schadt, U.S. Pat. No. 4,225,665. Upon completion of stretching and application of subbing composition, it is necessary to remove strain and tension in the base by a heat treatment comparable to the annealing of glass.

The emulsions may be coated on the supports mentioned above as a single layer or multi-layer element. For medical X-ray applications, for example, layers may be coated on both sides of the support which conventionally contains a dye to impart a blue tint thereto. Contiguous to the emulsion layers it is conventional, and preferable, to apply a thin stratum of hardened gelatin supra to said emulsion to provide protection thereto.

Medical X-ray film processing is well documented in the art as exemplified in Wuelfing, U.S. Pat. No. 4,741,991. A exposed medical X-ray film is typically developed to convert latent image centers within the silver halide grain into elemental silver. Unreacted silver halide is then removed by dissolving in a suitable fixer and the film is washed and dryed to provide a suitable image.

ULTRAVIOLET SCREEN PREPARATION

An X-ray intensifying screen structure was made using the following procedures:

A. The Binder Solution:
The following ingredients were prepared:

| Ingredient | Amount (g) |
| --- | --- |
| n-Butyl acetate | 43.13 |
| n-Propanol | 34.00 |

-continued

| Ingredient | Amount (g) |
| --- | --- |
| Carboset ® 525[1] | 10.00 |
| Carboset ® 526[2] | 10.00 |
| Polymeric organic silicone fluid | 0.07 |
| Zelec 2457E[3] | 0.40 |
| Aerosol ® OT-100[4] | 0.40 |
| Pluronic ® 31R1[5] | 2.00 |

[1]Acrylic resin; ave. mol. wt. 260,000; acid no. 76-85; B. F. Goodrich Co., Cleveland, OH
[2]Acrylic resin; ave. mol. wt. 200,000; acid no. 100; B. F. Goodrich Co., Cleveland, OH
[3]Anionic antistatic agent of mixed mono and dialkylphosphates of the general structure $R_2HPO_4$, where R is C8 to C10 alkyl; E. I. du Pont de Nemours & Co., Wilmington, DE
[4]Sodium dioctyl sulfosuccinate per U.S. Pat. No. 2,441,341
[5]Ethylene oxide/propylene oxide block copolymer; ave. mol. wt. 3,200; BASF Wyandotte, Wyandotte, MI B. The X-ray Phosphor:
The following ingredients were thoroughly mixed in a paint shaker for about 2 hours before charging to a alumina crucible:

| Ingredient | Amount (g) |
| --- | --- |
| $Y_2O_3$ | 101.46 |
| $Ta_2O_5$ | 198.54 |
| $Li_2SO_4$ | 150.00 |

The crucible was then placed in a standard, commercial, high temperature furnace and fired at about 1200° C. for about 8 hours and then at about 1250° C. for about 16 hours. The furnace was then allowed to cool and the contents of the crucible weighed and washed thoroughly with water to remove the unreacted salts and flux. This material was then added to the binder from above using about 200 g of phosphor/60 g of binder solution. This material was placed in a plastic container along with about 85 g of 3.8 in. diameter corundum balls (ca. 15 balls) and ball milled for about 2 to 16 hours at room temperature with a rotation speed of about 60 rpm. After this step, the ball milled suspension was filtered through a 75 mesh Nylon bag and coated onto a 0.010 inch thick, dimensionally stable polyethylene terephthalate film containing a small amount of a whitener (e.g., anatase $TiO_2$) dispersed therein (optical density of ca. >1.7). The coating weight of the phosphor-binder layer was about 53 mg of phosphor per $cm^2$.

C. The Overcoat Layer:

| Solution 1 | |
| --- | --- |
| Ingredient | Amount (g) |
| Acetone | 67.00 |
| Methanol | 9.00 |
| n-Butyl acetate | 4.80 |
| Tyril ® 100[1] | 12.70 |
| Carboset ® XL-27[2] | 9.00 |

[1]Styrene/acrylonitrile copolymer resin; Dow Chemical Co., Midland, MI
[2]Acrylic resin; ave. mol. wt. 30,000; acid no. 80, B. F. Goodrich Co., Cleveland, OH

| Solution 2 | |
| --- | --- |
| Ingredient | Amount (g) |
| Methanol | 14.70 |
| Triamylamine | 0.20 |
| Carbopol ® 1342[1] | 0.132 |

[1]Acrylic resin thickener; B. F. Goodrich Co., Cleveland, OH

This solution is filtered and 50.0 grams of Solution 1 was mixed with 12.19 grams of Solution 2. This mixture is coated on top of the phosphor-binder layer using a doctor knife with a 0.004 in. gap. The topcoat layer was air dried for 12–16 h at 40° C.

EXPOSURE AND DEVELOPMENT PROCEDURES

The cassettes containing the appropriate screen and film were given as exposure through a conventional resolution test target which contains a knife edge and through a standard aluminium step wedge at 70 KvP with a tungsten cathode X-ray source. After exposure, the films were processed in a conventional medical X-ray processor using a medical X-ray developer and fixer formulation in accordance with the teachings provided in Wuelfing, U.S. Pat. No. 4,741,991. The resulting film was then washed and dried.

The advantages of the radiological system in accordance with the present invention can be seen in FIGS. 2–7. FIGS. 2, 3 and 6 illustrate the contrast transfer function of conventional radiographic systems. FIGS. 4 and 7 illustrate the contrast transfer function of the radiological system according to the present invention. FIG. 5 illustrates the contrast curves for three commercial films which were used in generating the contrast transfer function curves illustrated in FIGS. 2–4 and 6–7.

As can be seen from these Figures, increasing the latitude in a conventional system results in a lower contrast, lower resolution image (i.e., a decrease in contrast transfer function). When the combination of X-ray screen and film of the radiological system of the present invention is used (FIGS. 4 and 7), the contrast transfer function (and, thus, resolution) is greatly improved without any adverse effect on the exposure latitude of the system. Thus, the system of the present invention provides a wide range of exposure latitude and, unexpectedly, a high resolution image with contrast quality about the same as those seen in systems having a much narrower latitude range.

What is claimed is:

1. A high resolution radiographic system comprising, in combination: at least one X-ray intensifying screen in operative association with a photosensitive silver halide element; wherein said radiographic system has a contrast transfer function of at least 0.30 when measured at 6 line pairs per millimeter and a relative speed of at least 150; and wherein said silver halide element has a maximum contrast of less than or equal to 3.0.

2. The high resolution radiographic system of claim 1, wherein said system has a relative speed of at least 250.

3. The high resolution radiographic system of claim 1, wherein said system has a relative speed of at least 350.

4. The high resolution radiographic system of claims 1, 2, or 3, wherein said silver halide element has a maximum contrast of less than or equal to 2.5.

5. The high resolution radiographic system of claim 1, 2, or 3, wherein said at least one X-ray intensifying screen comprises a phosphor-binder layer coated on a support; wherein said phosphor-binder layer comprises a binder with a phosphor dispersed therein; wherein at least 80% of the emission from said phosphor is between 300 and 390 nm; and wherein said binder absorbs less than 10% of any ultraviolet light emitted from said phosphor.

6. The high resolution radiographic system of claim 5, wherein at least 80% of the emission from said phosphor is between 310 and 360 nm.

7. The high resolution radiographic system of claim 1, 2, or 3, wherein said at least one X-ray intensifying screen comprises a phosphor-binder layer coated on a support; wherein said phosphor-binder layer comprises a binder with a phosphor dispersed therein; and wherein said phosphor is selected from the group consisting of:
   a) M' phase $YTaO_4$
   b) M' phase $YTaO_4$:A, wherein A is from the group consisting of gadolinium, bismuth, lead, cerium, or combinations thereof;
   c) LaOBr:A, wherein A is from the group consisting of gadolinium or a combination of gadolinium and thulium; and
   d) $La_2O_2$:Gd.

8. The high resolution radiographic system of claim 1, 2, or 3, further comprising a pair of X-ray intensifying screens in operative association with said photosensitive silver halide element; wherein said silver halide element comprises two photosensitive silver halide emulsions coated on opposite sides of a support.

* * * * *